(12) United States Patent
Achtelik et al.

(10) Patent No.: US 9,051,050 B2
(45) Date of Patent: Jun. 9, 2015

(54) ROTARY-WING AIRCRAFT

(75) Inventors: Michael Achtelik, Stockdorf (DE); Jan Stumpf, Planegg (DE); Daniel Gurdan, Grafelfing (DE); Klaus-Michael Doth, Oberasbach (DE)

(73) Assignee: Ascending Technology GmbH, Krailling (DE)

( * ) Notice: Subject to any disclaimer, the term of this patent is extended or adjusted under 35 U.S.C. 154(b) by 673 days.

(21) Appl. No.: 12/922,895

(22) PCT Filed: Mar. 17, 2009

(86) PCT No.: PCT/EP2009/001965
§ 371 (c)(1),
(2), (4) Date: Sep. 16, 2010

(87) PCT Pub. No.: WO2009/115300
PCT Pub. Date: Sep. 24, 2009

(65) Prior Publication Data
US 2011/0017865 A1    Jan. 27, 2011

(30) Foreign Application Priority Data

Mar. 18, 2008  (DE) .......................... 10 2008 014 853

(51) Int. Cl.
*B64C 27/08*    (2006.01)
*B64C 39/02*    (2006.01)
*B64D 47/08*    (2006.01)

(52) U.S. Cl.
CPC .............. *B64C 39/024* (2013.01); *B64C 27/08* (2013.01); *B64C 2201/024* (2013.01); *B64C 2201/027* (2013.01); *B64C 2201/108* (2013.01); *B64C 2201/123* (2013.01); *B64C 2201/127* (2013.01); *B64D 47/08* (2013.01)

(58) Field of Classification Search
USPC ..... 244/17.23, 17.19, 23 B, 23 A, 23 C, 12.3, 244/12.4, 17.27
See application file for complete search history.

(56) References Cited

U.S. PATENT DOCUMENTS

| | | | | |
|---|---|---|---|---|
| 1,749,471 | A * | 3/1930 | De Bothezat | 416/130 |
| 1,892,036 | A   | 12/1932 | Campens | |
| 2,571,566 | A * | 10/1951 | Green | 244/17.23 |
| 2,651,480 | A * | 9/1953 | Pullin | 244/17.23 |
| 2,987,272 | A * | 6/1961 | Vogt | 244/17.23 |
| 3,185,410 | A * | 5/1965 | Smart | 244/17.23 |
| 4,032,084 | A   | 6/1977 | Black | |
| 5,178,344 | A * | 1/1993 | Dlouhy | 244/12.2 |

(Continued)

FOREIGN PATENT DOCUMENTS

DE     102005022706 A1    11/2006

OTHER PUBLICATIONS

Curtiss-Wright VZ-7. Wikipedia. <http://en.wikipedia.org/wiki/Curtiss-Wright_VZ-7>.*

(Continued)

*Primary Examiner* — Tien Dinh
*Assistant Examiner* — Michael A Fabula
(74) *Attorney, Agent, or Firm* — Raymond R. Ferrera; Adams and Reese LLP (57) ABSTRACT

A rotary-wing aircraft (100), comprising at least four rotors (110), which are disposed on girder elements (120a, 120b), wherein said rotors (110) and girder elements (120a, 120b) are disposed such that a free field of vision (S) is defined along a longitudinal axis (L) of said rotary-wing aircraft (100) at least between two terminal rotors.

15 Claims, 5 Drawing Sheets

(56) References Cited

U.S. PATENT DOCUMENTS

| 7,959,104 B2* | 6/2011 | Kuntz | 244/2 |
|---|---|---|---|
| 2006/0016930 A1* | 1/2006 | Pak | 244/12.4 |
| 2008/0048065 A1* | 2/2008 | Kuntz | 244/17.23 |
| 2009/0008499 A1* | 1/2009 | Shaw | 244/17.23 |

OTHER PUBLICATIONS

English Abstract for DE 10 2005022706 A1 to Dolch.*
English Machine Translation for DE 10 2005022706 A1 to Dolch.*
Office Action issued Jul. 30, 2013 in corresponding Japanese patent application No. 2011-500112 with English translation (7 pages).

* cited by examiner

ROTARY-WING AIRCRAFT

CROSS REFERENCE TO RELATED APPLICATIONS

This application is the National Stage of International Application No. PCT/EP2009/001965, filed Mar. 17, 2009.

BACKGROUND OF THE INVENTION

This invention relates in general to rotary-wing aircraft with a plurality of rotors. More particularly, the invention relates to a rotary-wing aircraft which is especially suitable for still and video photography from the air.

Rotary-wing aircraft with a plurality of rotors are well known in the state of the art. Currently, the most widely used types are quadrocopters, which are defined by four rotors disposed in a single plane and acting substantially vertically downwards. The advantage of rotary-wing aircraft with a plurality of rotors is in general that the three flight axes—the longitudinal axis, lateral axis and vertical axis—can be controlled simply by variation of the thrust of the individual rotors.

Such aircraft are increasingly commonly used for still and video photography from the air. For this purpose, manually controlled or autonomous rotary-wing aircraft similar to model helicopters are employed.

From DE 102005061741A1, a multiple-rotor flying system is known, in which the rotors are realized as collectively variable independently of each other.

From DE 202006013909U1, an aircraft, in particular a quadrocopter, is known, comprising a centrally disposed base element and in particular arms releasably disposed on the base element by means of plug-in or screwed connections.

From DE 102006021182A1, an aircraft is known comprising four horizontal drive rotors, of which two are disposed one above the other sharing a common axis of rotation.

The paper "McKerrow, P, Modelling the Draganflyer four-rotor helicopter, Proceedings of the IEEE International Conference on Robotics and Automation, 26 Apr.-1 May 2004, 4, 3596-3601. Copyright IEEE 2004, http://ro.uow.edu.au/info-papers/100" describes a remote-controlled four-rotor helicopter and gives a theoretical analysis of the dynamics of this helicopter in order to develop a computer control system for stable hovering.

AT 203 876 B describes a helicopter which, in order to extend the possible uses of a helicopter of this type, comprises at least two lifting rotors.

U.S. Pat. No. 6,260,796 B1 discloses a feedback control system for a multi-rotor helicopter.

DE 10 2005 010 336 A1 describes a helicopter provided with three or more lifting units, each of which comprises at least one rotor and at least one electronically commuted direct current motor which drives the rotor. At least one sensor which is used to detect rotational displacement of a rotating component of the lifting unit is provided for, preferably, each lifting unit.

EP 1 901 153 A1 discloses an autonomous miniature helicopter with a plurality of rotors, and a method for controlling such a helicopter by applying real-time adjustment when evaluating flight parameters of the helicopter.

WO 2005/035362 A1 describes cargo transport means provided with transfer means, comprising two parallel arranged systems of rotors, for movement of the cargo up to a height of 80 km above the earth surface.

The aircraft according to the state of the art have in common that loads such as optical or sensor elements, e.g. for still or video photography or environment capture, must be disposed centrally on the aircraft either above or below the plane of the rotors, in order to distribute the load equally between the individual rotors. One consequence of this is that the field of vision of the optical or sensor elements is limited by the rotor plane and other components of the support system. In the case of still and video photography, for example, parts of the support system are visible in the image if its angle of view is too great or the camera is not sufficiently inclined downwards (if it is mounted below the plane of the rotors) or upwards (if it is mounted above the plane of the rotors).

In addition, for reasons that are inherent in the system and independent of the number of rotors, a rotary-wing aircraft must tilt in the direction of flight in order to accelerate in this direction. In some applications, this requires active tilt compensation for the optical or sensor elements, in order to ensure that the object to be captured does not leave the capture area due to the tilting. In the state of the art, if the tilt angles are too great parts of the support system protrude into the capture area as a result of the tilt compensation. This further reduces the unimpeded image area of these elements.

BRIEF SUMMARY OF THE INVENTION

It is thus the object of the invention to provide a rotary-wing aircraft which overcomes these disadvantages of the state of the art. This object is achieved by a rotary-wing aircraft, comprising at least four rotors, which are disposed on girder elements, wherein said rotors and girder elements are disposed such that a free field of vision is defined along a longitudinal axis of said rotary-wing aircraft at least between two terminal rotors; and wherein the girder elements provide a straight-line connection between the rotors on each side of the longitudinal axis; and wherein the girder elements are disposed in a V shape symmetrically with respect to the longitudinal axis.

DETAILED DESCRIPTION OF THE INVENTION

In accordance with the above-mentioned object, a rotary-wing aircraft is provided comprising at least four rotors, which are disposed on girder elements, wherein said rotors and girder elements are disposed such that a free field of vision is defined along a longitudinal axis of the aircraft at least between two terminal rotors.

By this means it is possible for the first time for optical and/or sensor elements disposed on the aircraft according to the invention to capture continuously and unimpeded the areas both above and below the plane of the rotors, as well as the area within the plane of the rotors along at least one direction of the aircraft's longitudinal axis. In particular, by this means a single optical and/or sensor element can be pivoted from an area above the plane of the rotors, through the plane of the rotors, to an area below the plane of the rotors, and in the reverse direction, without components of the aircraft protruding into the image or capture area of the optical and/or sensor element during pivoting.

In contrast to systems according to the state of the art, it is possible with the aircraft according to the invention for example for a single camera to capture objects or persons on film from below, or from an angled front view, or from the front, or from above, without a change in configuration. Furthermore, with the aircraft according to the invention, it is possible in a single flight to film from below (e.g. when flying under a bridge) and also from the side or from above. For the first time it is not necessary to reposition the camera for the different views that are filmed. The pivot range of the camera can be considerably greater than that provided by conventional systems.

The camera in the aircraft according to the invention can thus adopt any desired orientation in space, i.e. it can capture any point within its surrounding sphere. For this, a suitable pivot mechanism can effect the above-mentioned pivoting of the camera in a vertical direction, while the horizontal variation of the capture area is achieved by rotating the aircraft as a whole around its vertical axis.

In addition, the pivot range of the camera in the aircraft according to the invention can be independent of a pitching motion of the aircraft. With a tilt-compensated suspension of the optical and/or sensor elements, the aircraft can freely tilt for acceleration and braking without impeding the recording due to the protrusion of rotor or girder components into the capture area. This is ensured whether capture at the time is in a downwards, forwards or upwards direction.

Such an aircraft can be deployed wherever conventional helicopters and quadrocopter systems have hitherto been deployed. It can, however, also be used for filming which requires a substantially greater range of vertical movement of the camera.

In connection with the invention, the "longitudinal axis" or "roll axis" of the aircraft is the axis through the center of gravity of the aircraft which extends in the usual, preferred or design determined direction of forward movement of the aircraft. It is usually, but not necessarily, the aircraft's longest axis of symmetry. The "terminal rotors" are considered to be the rotors located foremost or rearmost in the direction of the longitudinal axis of the aircraft.

The term "free field of vision" in connection with the invention means an area which is free of components of the aircraft, so that looking outwards from a point of origin within the spatial limits of the aircraft it is possible to view or capture unimpeded the surrounding area outside the spatial limits of the aircraft, for instance by means of optical and/or sensor elements.

The free field of vision is preferably defined along the longitudinal axis originating from a point near the center of gravity of the aircraft. In other words, a point near the center of gravity of the aircraft is particularly appropriate as the point of origin within the spatial limits of the aircraft. This has the advantage that when loads such as optical and/or sensor elements are carried, they can be disposed near the center of gravity, in order to have as little influence as possible on the flight characteristics of the aircraft.

The free field of vision can preferably extend horizontally more than ±15° with respect to the longitudinal axis, for example more than ±30° and in particular more than ±45°, originating from a point near the center of gravity of the aircraft. The vertical extension of the free field of vision can preferably be greater than ±15°, for example greater than ±60°, greater than ±90°, and in particular greater than ±120°, with respect to the longitudinal axis, originating from a point near the center of gravity of the aircraft.

The greater the angular width of the opening, the larger the area which can be captured or photographed, and for example the smaller the focal length of a lens that can be chosen. An angular width of 30° for the opening corresponds approximately to the picture angle which is imaged by a lens with a focal length of 80 mm in 35 mm format (telephoto lens). An angular width of 90° for the opening corresponds approximately to the picture angle which is imaged by a lens with a focal length of 22 mm in 35 mm format (wide-angle lens). A large vertical extension of the free field of vision has the additional advantage that an optical and/or sensor element can be pivoted vertically, whether for tilt compensation or for unimpeded pivoting from an area above the plane of the rotors, through the plane of the rotors, to an area below the plane of the rotors, and in the reverse direction.

Preferably, the at least four rotors can be disposed on the girder element in pairs on opposite sides of the longitudinal axis of the rotary-wing aircraft, and at least the forward (with respect to the longitudinal axis) pair of rotors can be disposed at a distance from each other such that the free field of vision is defined between this pair of rotors. Preferably, this distance can be at least one rotor diameter, or greater.

In a preferred embodiment of the invention, the girder elements can extend substantially in a straight line on both sides of the longitudinal axis. A straight girder element has the advantage that the forces exerted by the individual rotors disposed on the girder both act on a highly compact component, and also generate no torsion in the component. Thus a straight-line connection between the individual rotors on each of the sides of the longitudinal axis achieves a high degree of stiffness at low material cost, in particular by comparison with a separate connection of each individual rotor to the center of gravity of the aircraft. In addition, cables and/or electronics for power supply or control can be accommodated on or in the connecting pieces between the individual rotors. This serves to make the design of the aircraft simple and clear, with furthermore low susceptibility to wear. Additionally, straight-line girder elements are simple to machine and inexpensive to procure.

The girder elements can be disposed at a distance from each other, connected to each other, or integrally formed. Preferably, the girder elements can describe a V shape. In the case of a closed V arrangement, the girder elements meet at their point of intersection with the axis of symmetry, or they are connected there or integrally formed, while in the case of an open V arrangement they are disposed with a separation between them. The girder elements can also describe a U shape, an H shape or an II shape.

Particularly preferably, the girder elements can be disposed in a V shape symmetrically with respect to the longitudinal axis. Such an arrangement enables the creation of an angular width of the opening by virtue of which the free field of vision between the rotors that are widest apart is advantageously further increased. Such a V arrangement also permits a simple, and in particular torsion-resistant, design, since only some of the rotors are at an increased distance from the center of gravity of the aircraft. The other rotors can be located near the center of gravity of the aircraft, so that they have short connecting paths to the center of gravity; as a result only short structures, without additional reinforcement, are required to achieve inner stiffness.

In a further preferred embodiment of the invention, the rotary-wing aircraft can further comprise at least one strut element, which can serve to connect and/or brace the girder elements. By this means the aircraft can be provided with additional stiffness. The at least one strut element can be particularly advantageously configured in the shape of an X; that is to say a particularly preferred, torsion-resistant design results if the straight girder elements are connected to each other via cross-shaped or X-shaped strut elements. A right-angled, rigid intersection point in the X offers great rigidity and simple assembly; a releasable or moveable intersection point in the X enhances the possibilities for disassembly or folding up of the aircraft.

In a particularly preferred embodiment of the invention, the connections between the girder elements and the at least one strut element can be configured to be releasable. By this means a modular design which is simple to dismantle is achieved; this facilitates not only the rapid assembly and disassembly of the aircraft, but also the simple replacement of damaged components.

Possible releasable connections are snap-locking, plug-in or threaded connections, which are advantageously supplied with suitable locking mechanisms. The releasable connections can also be provided with a release mechanism which allows the connections to be released if uncontrolled forces are exerted. In the case of a hard landing of the aircraft, the releasable connection would thereby be severed first, before additional components were damaged. Such a design can in many cases contribute to the avoidance of damage to the components in the event of a crash of the aircraft: only the release of the connections would result. All devices known in the state of the art can be considered as possible release mechanisms, in particular lightweight release mechanisms of sufficient durability.

In a further, particularly preferred embodiment of the invention, the connections between the girder elements and the at least one strut element can be realized such that the entire aircraft can be folded up into a collapsed state using only a few hand movements. In particular, for this purpose the aft connections (which are closer to each other) can be configured to be rotatable, and the forward connections (which are further apart from each other) can be configured to be releasable. To fold up such a design, the forward connectors can be released and the girder elements can then be rotated around the aft connectors in an inwards direction, i.e. towards each other, into the collapsed state. Subsequently the at least one strut element can be reattached to the girder elements, possibly at another point, by means of the forward connectors. In the collapsed state, both girder elements would thereby be disposed at a reduced distance from each other, preferably parallel to each other; the entire aircraft can now be transported securely assembled in a single piece.

The strut element can advantageously be designed such that its arms can be shortened, for instance telescopically, during the folding-in. Thus, when the aircraft is collapsed, primarily the forward arms can be shortened before reattachment to the girder elements, with a positive effect on the compactness of the collapsed state.

If the strut element is cross-shaped, it can be particularly advantageous if the angle at the point of intersection is variable. This makes it possible to dispose the girder elements at a particularly reduced distance from each other in the collapsed state.

In addition, the at least one strut element can advantageously be configured with a lower mechanical load capacity than the girder elements. In this way the at least one strut element can act as a predetermined breaking point in the case of exertion of uncontrolled force. This can also contribute to limiting the effects of an aircraft crash to the mere breaking of the at least one strut element, rather than damage to important components.

The girder and strut elements can be formed from lightweight materials such as aluminum, magnesium, or carbon fiber materials, or similar. These elements preferably comprise at least one sectional beam or hollow beam, in particular an I-beam, U-beam, Z-beam, L-beam, H-beam or T-beam, a double crossbeam, a round or rectangular tube, of a solid or hollow construction, or a combination of these.

The girder and strut elements can advantageously have a hollow construction. This serves firstly to save weight. Secondly, in the hollow spaces within the elements it is possible to accommodate for example a cable duct, power electronics, control electronics, a power supply and/or motors to drive the rotors.

According to one aspect of the invention, the number of rotors can be chosen so as to provide redundancy of thrust, in order to maintain the aircraft's flying and maneuvering capacity in case of failure of a rotor. In particular, there is redundancy of thrust if more than one rotor operates in each quadrant defined by the intersection between the longitudinal axis and a lateral axis of the aircraft. In a particularly preferred embodiment of the invention, the rotary wing aircraft can thus comprise at least eight rotors. If one or more rotors fail, the remaining rotors can then be controlled such that the aircraft is still capable of flight.

In a further preferred embodiment of the invention, the rotary-wing aircraft can further comprise a body element. The body element is advantageously located in proximity to the center of gravity of the aircraft, and can serve as the base or receptacle for the control and power electronics and the power supply, as well as the strut element to the girder elements. In addition, optical and/or sensor elements, or a mounting for optical and/or sensor elements, can be disposed on the body element. A concentration of these loads near the center of gravity of the aircraft leads to an improvement in the aircraft's flight characteristics.

The body element can advantageously be disposed with vibration damping with respect to the rest of the structure. This achieves a decoupling of the components which are optionally installed on the body element from the vibration generated by the rotors. In the case of the optical and/or sensor elements this is conducive to an improvement in the quality of the data or images recorded. All devices and methods known in the state of the art can be considered as possible vibration damping, such as for example rubber grommets, spring elements etc. By suspending the entire body element in a vibration damped manner, the entire mass of the body element, including the power supply, can be advantageously used as a mass for damping high frequency vibrations.

It is advantageous if the arrangement of all of the components of the aircraft, including any added equipment such as optical and/or sensor elements, can be chosen such that the resultant center of gravity coincides nearly or fully with a spatial midpoint of the aircraft. In this, the "spatial midpoint of the aircraft" means a point centrally located within the spatial boundaries of the aircraft. A particularly advantageous arrangement would be one in which, when the aircraft hovers, i.e. is without forward or sideways movement, all rotors deliver identical or nearly identical thrust. Firstly this has a favorable effect upon the flight characteristics, and secondly the moving parts such as motors and rotors thereby wear at approximately even rates, which extends the maintenance intervals and reduces the frequency at which repairs are needed.

By means of an exemplary combination of the preferred configurations "open V", "cross-shaped right-angled connecting element" and "vibration-damped body element", the following highly advantageous design can result: The intersection point of the X-shaped strut element can lie on the longitudinal axis aft of the spatial midpoint of the aircraft. The body element can be mounted with vibration damping on the cross-shaped connecting element. A forward-extending pivotable mounting for optical and/or sensor elements can be fitted onto the body element aft of the midpoint. Optical and/or sensor elements attached to this mounting are then located on the longitudinal axis forward of the body element and forward of the midpoint of the aircraft. By this means it is possible to achieve a highly compact design and, if the layout is appropriate, a balanced center of gravity close to the spatial midpoint of the aircraft, with at the same time a maximum field of vision.

BRIEF DESCRIPTION OF THE DRAWINGS

These and other characteristics, features and advantages of the subject-matter of the invention proceed from the subordinate claims and from the description hereinafter of the associated drawings, in which examples of preferred embodiments of the invention are illustrated by way of example. The drawings are as follows:

DETAILED DESCRIPTION OF THE DRAWINGS

Figure 1A:
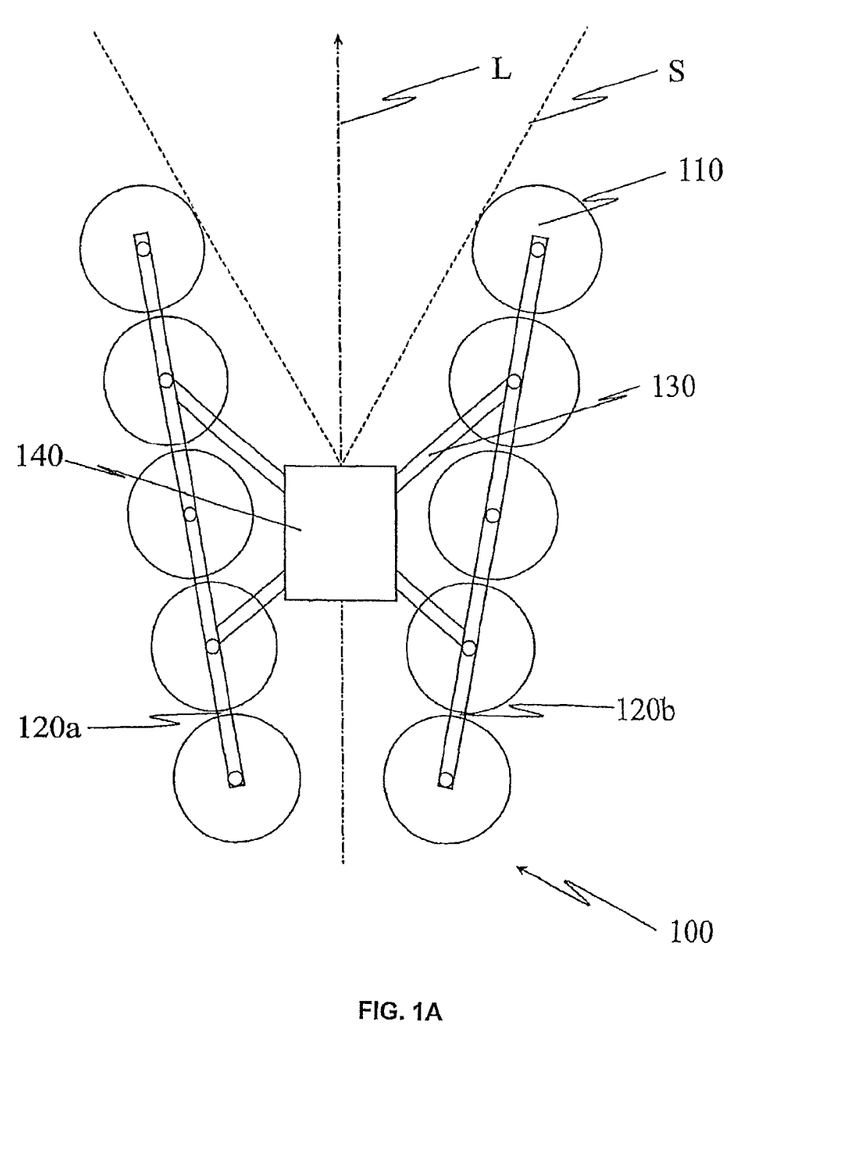
FIG. 1 is a schematic top view of a rotary-wing aircraft according to an embodiment of the invention.
Figure 1B:
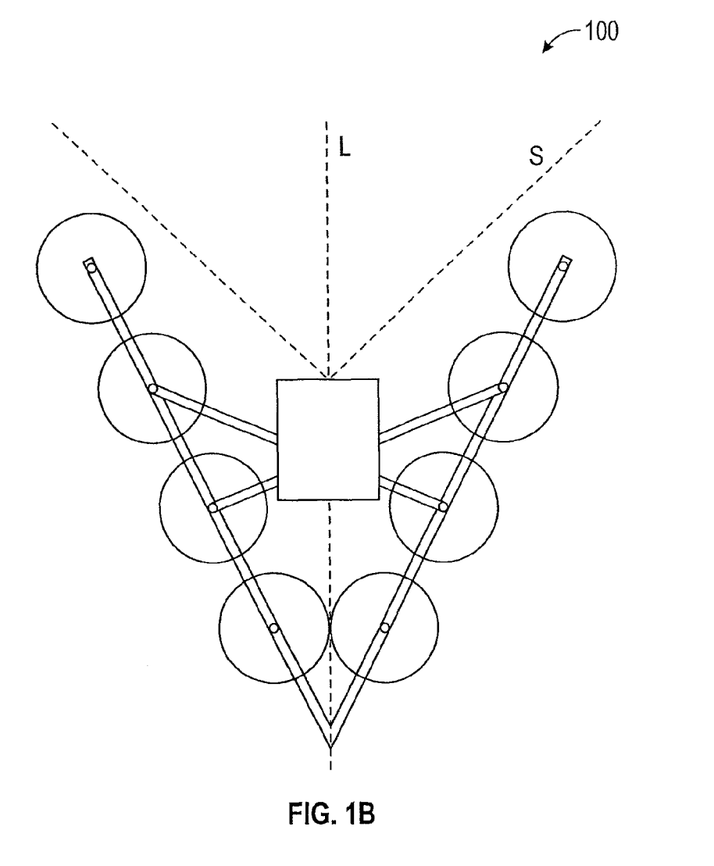
FIG. 1B is a schematic plan view of a rotary-wing aircraft according to another embodiment of the invention.

Referring to FIG. 1, a rotary-wing aircraft 100 with a total of ten rotors 110 is illustrated. The rotors 110 are disposed on girder elements 120a, 120b along both sides of a longitudinal axis L of the aircraft. The girder elements 120a, 120b are connected via strut elements 130. A body element 140 is attached to the strut elements 130 in the vicinity of the center of gravity of the aircraft. The body element 140 serves to bear the control electronics and power supply (not shown), as well as any optical (C) and/or sensor elements (SE).

The connections between the individual elements are configured as plastic screws (not shown). These generally have high resistance to tensile and compressive loads and lower resistance to shear forces. They can thus act as predetermined breaking points, without negatively influencing the load carrying capacity and stability of the aircraft. In addition, plastic screws are lightweight and inexpensive to produce.

The plastic screws are also suitable for the simple dismantling and reassembly of the aircraft. This facilitates transportation, and also allows defective components to be replaced simply and rapidly.

In the embodiment shown in FIG. 1, the girder elements 120a, 120b are straight, and aligned on both sides of the longitudinal axis L symmetrical to the axis. The rotors which are disposed at the front, in the direction of the longitudinal axis L which is indicated by the arrow on the longitudinal axis L, are further apart from each other than are the rotors behind them. This is achieved by disposing the straight girder elements 120a, 120b at an acute angle to the longitudinal axis L.

Because of this arrangement a free field of vision, indicated by the dashed lines S, is defined in the forward area of the aircraft. In an area extending ±30° from the longitudinal axis L, originating from the body element 140, the field of vision contains no components of the rotors or girder elements, or any other components of the aircraft. This enables an optical or sensor element (not shown) attached to the body 140 to capture unimpeded the region in front of the aircraft. In particular, it is thereby possible to capture the surroundings of the aircraft continuously from an area above the plane of the rotors, through the plane of the rotors, to an area below the plane of the rotors, without components of the aircraft protruding into the capture area during the process.

Figure 2:
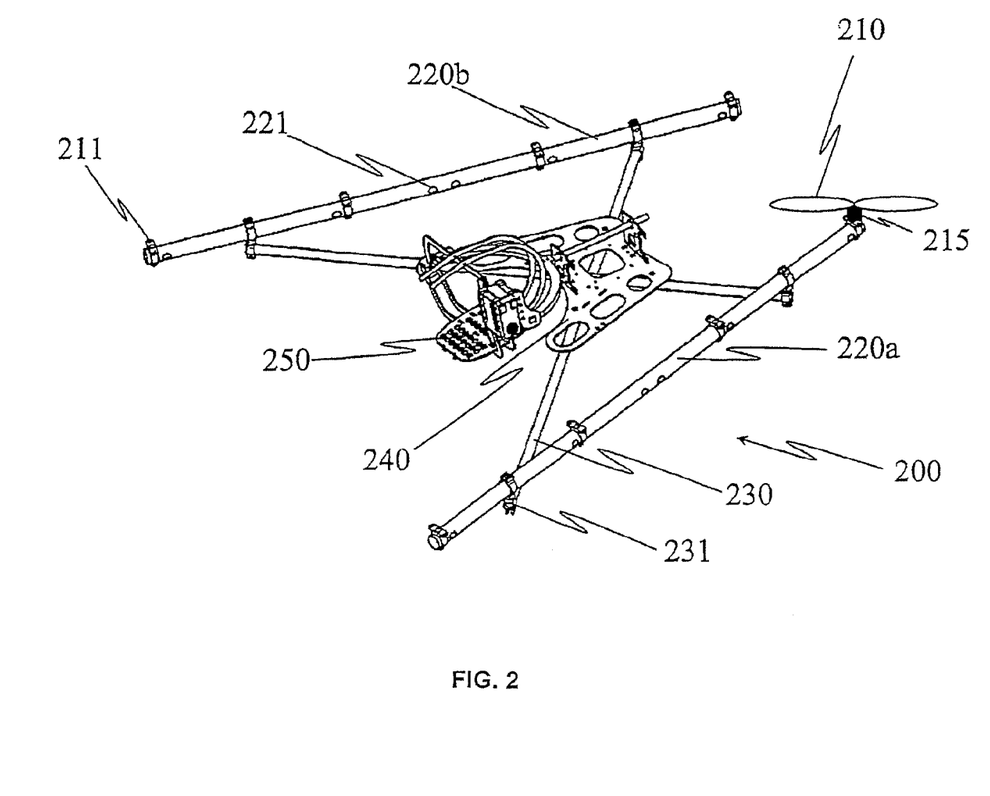
FIG. 2 is a schematic oblique view of a rotary-wing aircraft according to a further embodiment of the invention.

FIG. 2 shows an oblique view of a further embodiment of the invention. For greater clarity, seven of the eight rotors 210 and motors 215 are not shown.

Two girder elements 220a, 220b are arranged as an open V, and connected to each other via X-shaped strut elements 230. The connections between the girder elements 220a, 220b and the strut elements 230 are provided by clamps 231. The clamps are less robust than the girder elements 220a, 220b and the strut elements 230, and can thus act as predetermined breaking points. In addition, they can be simply and rapidly released, allowing the girder elements 220a, 220b to be removed from the strut elements 230.

On each of the girder elements 220a, 220b there are four motor mounts 211 spaced at equal distances from each other, to which motors 215 that drive the rotors are attached. The motors 215 are brushless and sensorless electric motors, each of which is controlled via its own power electronics (not shown). Each individual rotor thus has its own electric motor, resulting in maximum maneuverability.

At the intersection point of the strut elements 230, a body element 240 is attached in a vibration-damped manner. In the embodiment shown in FIG. 2 the body element 240 bears a displaceable camera mounting 250. The configuration is adjusted such that the body element 240 is aft of, and the camera mounting 250 forward of, the spatial midpoint of the aircraft. Both elements together, after a camera (not shown) is mounted on the camera mounting, result in a neutral center of gravity, with the result that when the aircraft hovers all rotors deliver the same thrust.

The camera mounting 250 can be pivoted, driven by a motor, by +120° relative to a horizontal plane of the aircraft and by +30° relative to a vertical plane of the aircraft, so that a camera (C) attached to the mounting can film the areas above, in front of, and below the aircraft merely by pivoting. The pivoting can also actively compensate for roll and pitch movements of the aircraft, which may for example be caused by acceleration or turning in flight.

The girder elements 220a, 220b are hollow members, with a diameter sufficient to accommodate the power electronics for controlling the motors 215.

The cables (not shown) for supplying power and controlling the individual components are led from their origin in the body element 240 through the cable openings 221 into the girder elements 220a, 220b, and onwards inside these. To permit simple disassembly, plug connectors are provided for disconnecting the cables. In this way the system shown in FIG. 2 can be dismantled with only a few hand movements into three manageable parts.

Figure 3:
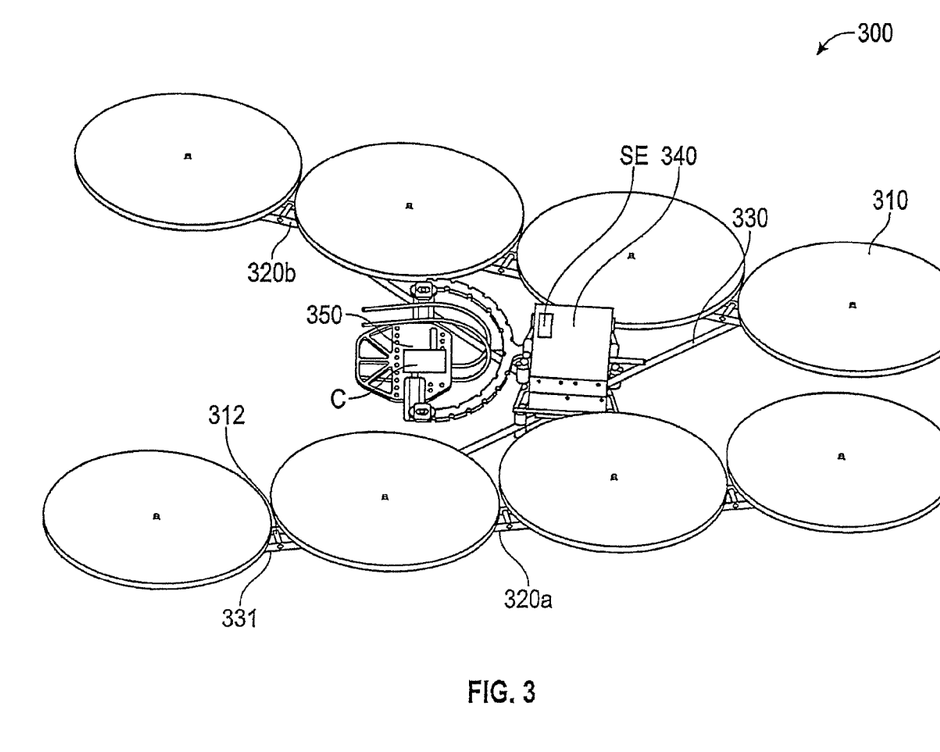
FIG. 3 is a schematic oblique view of a rotary-wing aircraft according to another further embodiment of the invention.

FIG. 3 shows an oblique view of another further embodiment of the invention. Here too, the aircraft comprises two girder elements 320a, 320b which are arranged as an open V. The girder elements 320a, 320b are connected to each other via X-shaped strut elements 330. On each of the girder elements 320a, 320b there are four rotors 310 spaced at equal distances from each other (shown schematically).

Each of the girder elements 320a and 320b is formed from a pair of hollow members. Between the hollow members in each pair there are a plurality of short connecting pieces 312, some of which can at the same time be used as motor mounts (not shown) and/or for the connection 331 of either of the girder elements 320a, 320b with the strut elements 330.

The intersection point of the X-shaped strut elements 330 lies on the longitudinal axis aft of the spatial midpoint of the aircraft 300. A body element 340 is attached with vibration damping to the intersection point of the X-shaped strut elements 330. A camera mounting 350, which is pivotable about two axes, is attached to the body element 340 facing forwards along the longitudinal axis. A camera attached at this point is therefore located forward of the spatial midpoint of the aircraft 300. This results in a highly compact design and a balanced center of gravity, with at the same time a maximum field of vision for the camera.

Figure 4A:
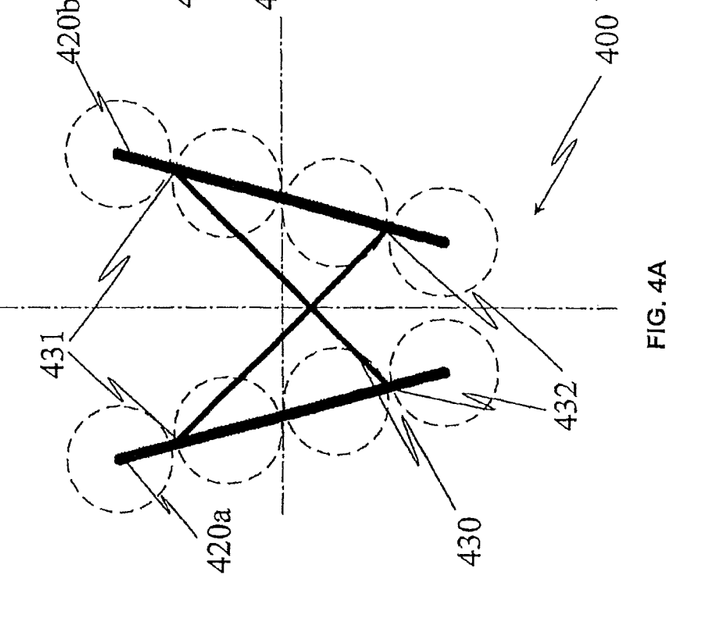
FIGS. 4a and 4b are schematic diagrams which illustrate the folding-up mechanism according to an embodiment of the invention.
Figure 4B:
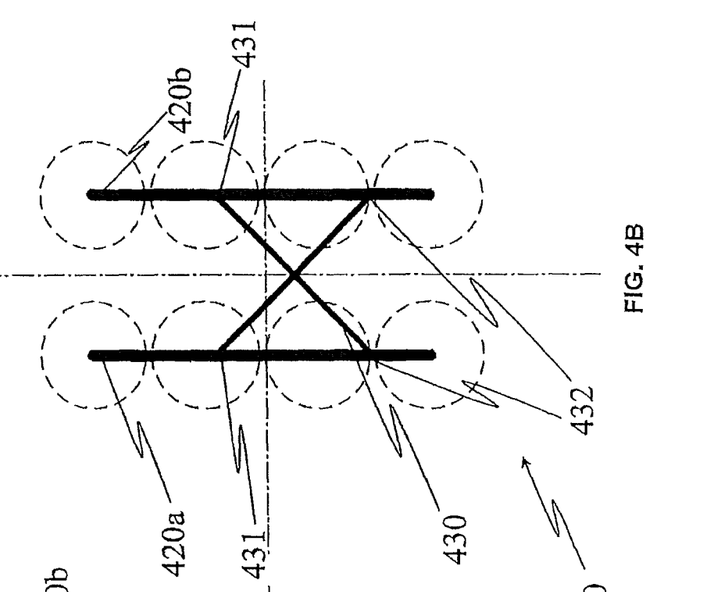

FIGS. 4a and 4b illustrate the folding-up mechanism according to a preferred embodiment of the invention. FIG. 4a shows the folded-out state, in which the aircraft 400 is operated. FIG. 4b shows the folded-up state, in which the aircraft 400 is transported.

To realize the folding mechanism, the aft connections 432 (which are closer to each other) between the girder elements 420a, 420b and the X-shaped strut element 430 are configured to be rotatable, and the forward connections 431 (which are further apart from each other) are configured to be releasable. To fold up the aircraft the forward connectors 431 are released and the girder elements 420a, 420b are then rotated around the aft connectors 432 in an inwards direction, i.e. towards each other, into the collapsed state shown in FIG. 4b. In this configuration the girder elements 420a, 420b are disposed close together and parallel to each other.

Subsequently the forward arms of the strut element 430 are retracted telescopically and thereby shortened. Finally the strut element 430 is reattached via the forward connections 431 to the girder elements 420a, 420b at a different point. In this final configuration, shown in FIG. 4b, the entire aircraft can be transported securely assembled in a single piece.

The components to be employed in the invention that are mentioned above, claimed, and described in the example embodiments are not subject as regards their size, shape, configuration, choice of materials or technical design to any particular exceptional conditions, with the result that the criteria for selection that are known in the field of application can be used without restriction.

Other embodiments of the invention will be evident to persons skilled in the art from consideration of the description and application of the invention disclosed herein. In particular, it will be evident to skilled persons that the girder elements can also be permanently connected to, or integrally formed with, the body element and/or the strut elements. Furthermore it is known to persons skilled in the art that an aircraft according to the invention possesses equivalent or nearly equivalent flight characteristics with respect to each of the three flight axes—the longitudinal axis, lateral axis and vertical axis—with the result that the longitudinal axis is merely the preferred, rather than the exclusive, direction of forward movement of the aircraft. Moreover the possibility is not excluded that a rotary-wing aircraft according to the invention is used for manned flight, so that the persons who are carried benefit from the advantageous characteristics that are mentioned herein. It is therefore intended that the description and the examples be considered merely as exemplary, with the scope of the invention being defined by the attached claims.

The invention claimed is:

1. A rotary-wing aircraft (100), comprising:
at least four rotors (110), which are disposed on girder elements (120a, 120b),
wherein said rotors (110) and girder elements (120a, 120b) are disposed such that a free field of vision (S) is defined along a longitudinal axis (L) of said rotary-wing aircraft (100) at least between two terminal rotors;
wherein the girder elements (120a, 120b) provide a straight-line connection between the rotors on each side of the longitudinal axis (L);
wherein the girder elements (120a, 120b), when viewed from a top view of the aircraft, are disposed in a closed V-shape arrangement symmetrically with respect to the longitudinal axis (L); and
wherein the girder elements connect at a point of intersection with the longitudinal axis.

2. The rotary-wing aircraft according to claim 1, wherein the free field of vision (S), originating from a point near the center of gravity of the aircraft, has an extension with respect to the longitudinal axis of more than ±15° in both the horizontal and the vertical planes.

3. The rotary-wing aircraft according to claim 1, wherein said rotary-wing aircraft further comprises at least one strut element (130) for bracing said girder elements (120a, 120b).

4. The rotary-wing aircraft according to claim 3, wherein said at least one strut element (130) is configured in the shape of an X.

5. The rotary-wing aircraft according to claim 3, wherein the connections between said at least one strut element (130) and said girder elements (120a, 120b) are releasably and/or rotatably configured.

6. The rotary-wing aircraft according to claim 1, further comprising a body element (140) with at least one mounting for accommodation of at least one optical and/or sensor element.

7. The rotary-wing aircraft according to claim 6, wherein said at least one mounting is adjustably disposed in proximity to the center of gravity of said rotary-wing aircraft.

8. Use of the rotary-wing aircraft according to claim 6 for environment capture, the use comprising the step of:
capturing environmental data with at least one of an optical and a sensor element attached to the at least one mounting.

9. A rotary-wing aircraft (100), comprising at least four rotors (110), which are disposed on girder elements (120a, 120b),
wherein said rotors (110) and girder elements (120a, 120b) are disposed such that a free field of vision (S) is defined along a longitudinal axis (L) of said rotary-wing aircraft (100) at least between two terminal rotors;
wherein the girder elements (120a, 120b) provide a straight-line connection between the rotors on each side of the longitudinal axis (L);
wherein the girder elements (120a, 120b), when viewed from a top view of the aircraft, are disposed in an open V-shape arrangement symmetrically with respect to the longitudinal axis (L); and
wherein the girder elements are connected to each other via at least one strut element.

10. The rotary-wing aircraft according to claim 9, wherein the free field of vision (S), originating from a point near the center of gravity of the aircraft, has an extension with respect to the longitudinal axis of more than ±15° in both the horizontal and the vertical planes.

11. The rotary-wing aircraft according to claim 9, wherein connections between said at least one strut element and said girder elements (120a, 120b) are releasably and/or rotatably configured.

12. The rotary-wing aircraft according to claim 9, further comprising:
a body element (140) with at least one mounting for accommodation of at least one optical and/or sensor element.

13. The rotary-wing aircraft according to claim 12, wherein said at least one mounting is adjustably disposed in proximity to the center of gravity of said rotary-wing aircraft.

14. Use of the rotary-wing aircraft according to claim 12 for environment capture, the use comprising the step of:

capturing environmental data with at least one of an optical and a sensor element attached to the at least one mounting.

15. The rotary-wing aircraft according to claim 9, wherein said at least one strut element is configured in the shape of an X.

* * * * *